H. C. ALGER.
LIQUID METER.
APPLICATION FILED JULY 6, 1909.

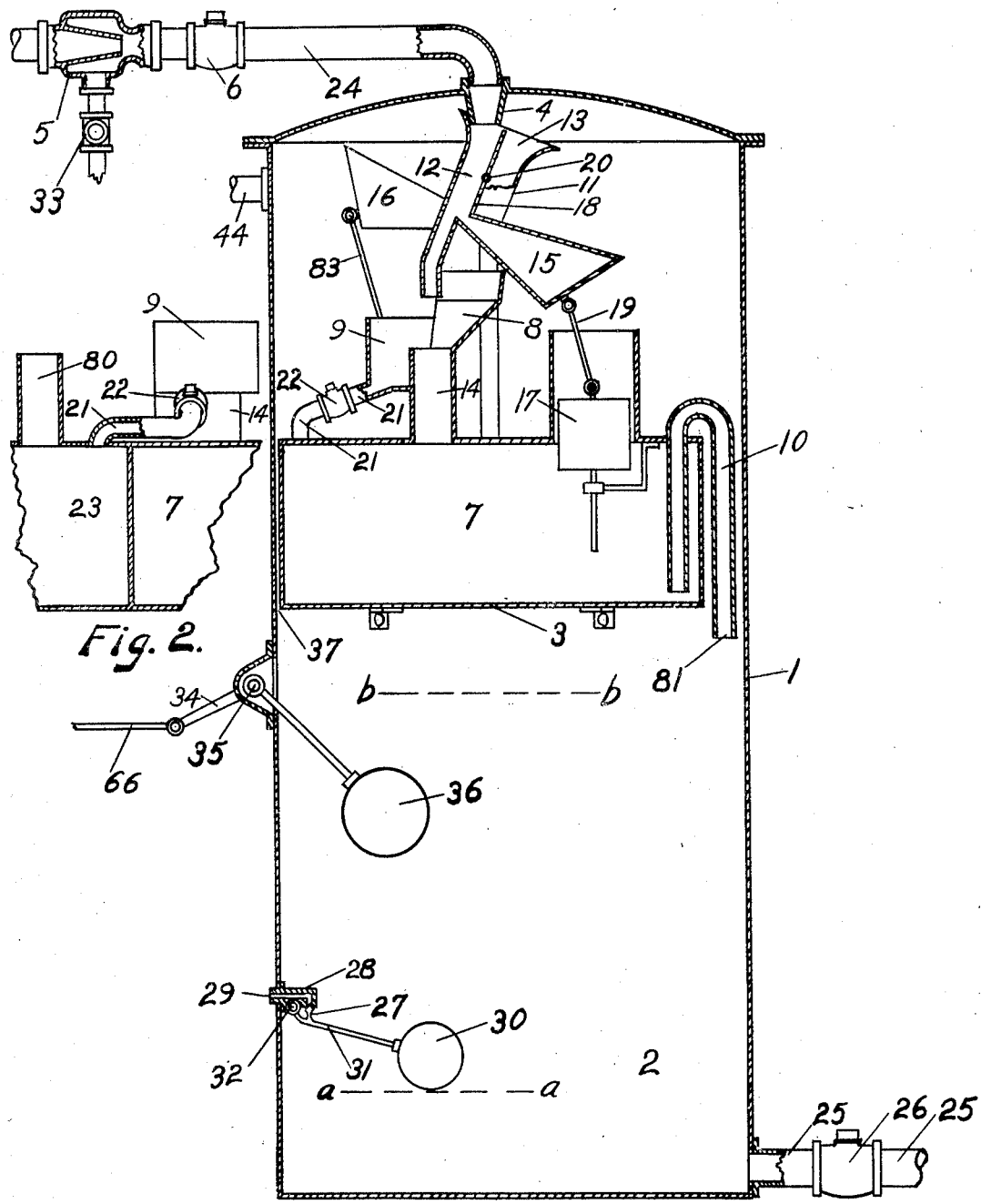

1,025,358.

Patented May 7, 1912.
5 SHEETS—SHEET 4.

WITNESSES
Florence V. Pedersen.
Irvin E. Dischinger.

INVENTOR
Harley Clifford Alger

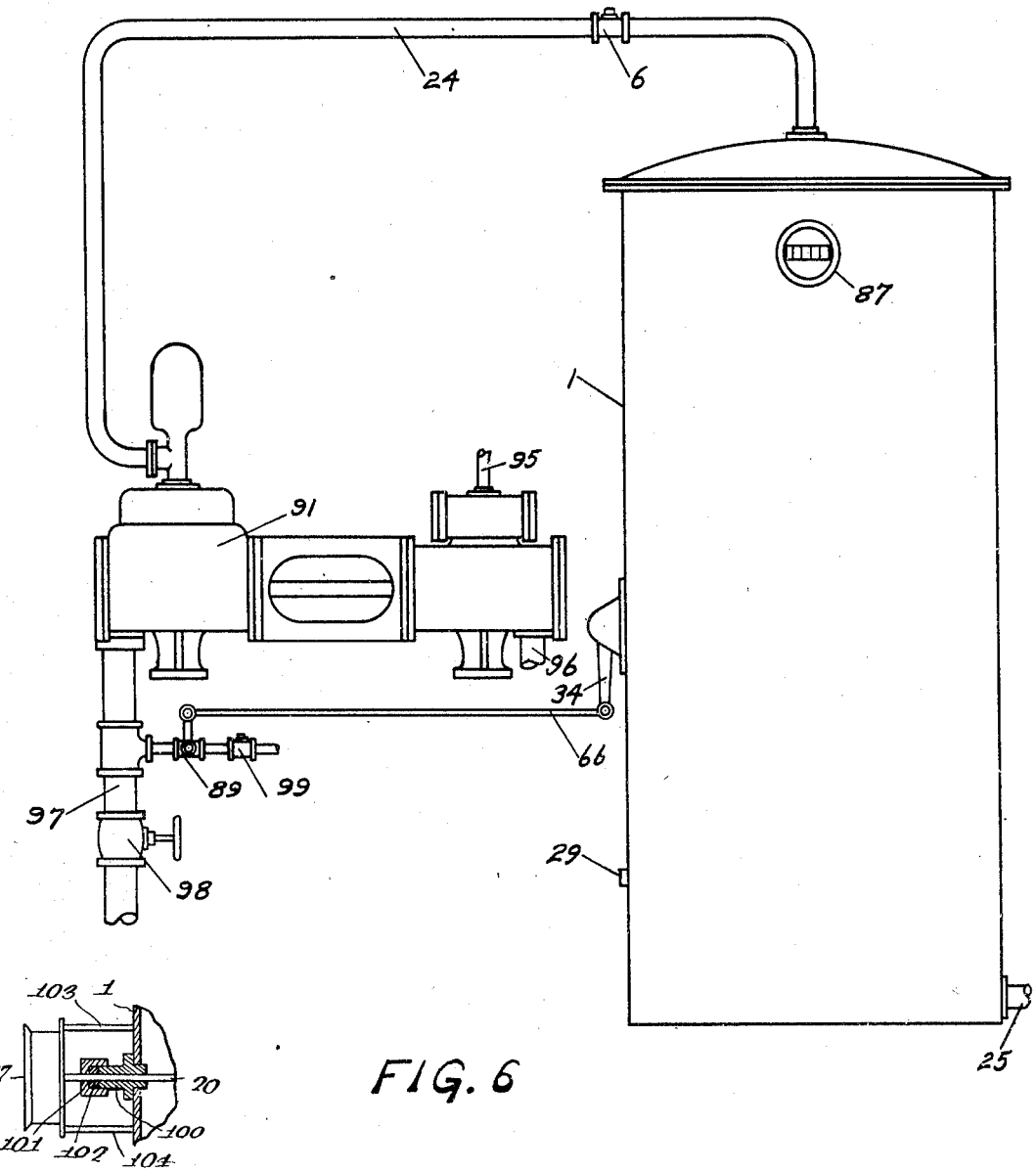

UNITED STATES PATENT OFFICE.

HARLEY CLIFFORD ALGER, OF CHICAGO HEIGHTS, ILLINOIS.

LIQUID-METER.

1,025,358.  Specification of Letters Patent.  Patented May 7, 1912.

Application filed July 6, 1909. Serial No. 506,035.

*To all whom it may concern:*

Be it known that I, HARLEY C. ALGER, a citizen of the United States, residing at Chicago Heights, in the county of Cook and State of Illinois, have invented certain new and useful Improvements in Liquid-Meters; and I do hereby declare the following to be a full, clear, and exact description of the invention, such as will enable others skilled in the art to which it appertains to make and use the same.

My invention relates to improvements in liquid measuring devices whereby measuring tanks measuring by weight or volume, or other measuring devices, are adapted to operate under pressure, greater or less than atmospheric pressure, one object being to provide a means for accurately measuring liquid while under pressure and to provide a means for attaining this result in which the liquid may be received, measured and delivered automatically as required.

A further object is to provide a meter for accurately measuring liquid while under pressure whereby the pressure of the liquid to be measured is transmitted by means of an air cushion to the liquid already measured so that the liquid may be delivered from the pressure meter without appreciable loss in pressure.

Figure 3:
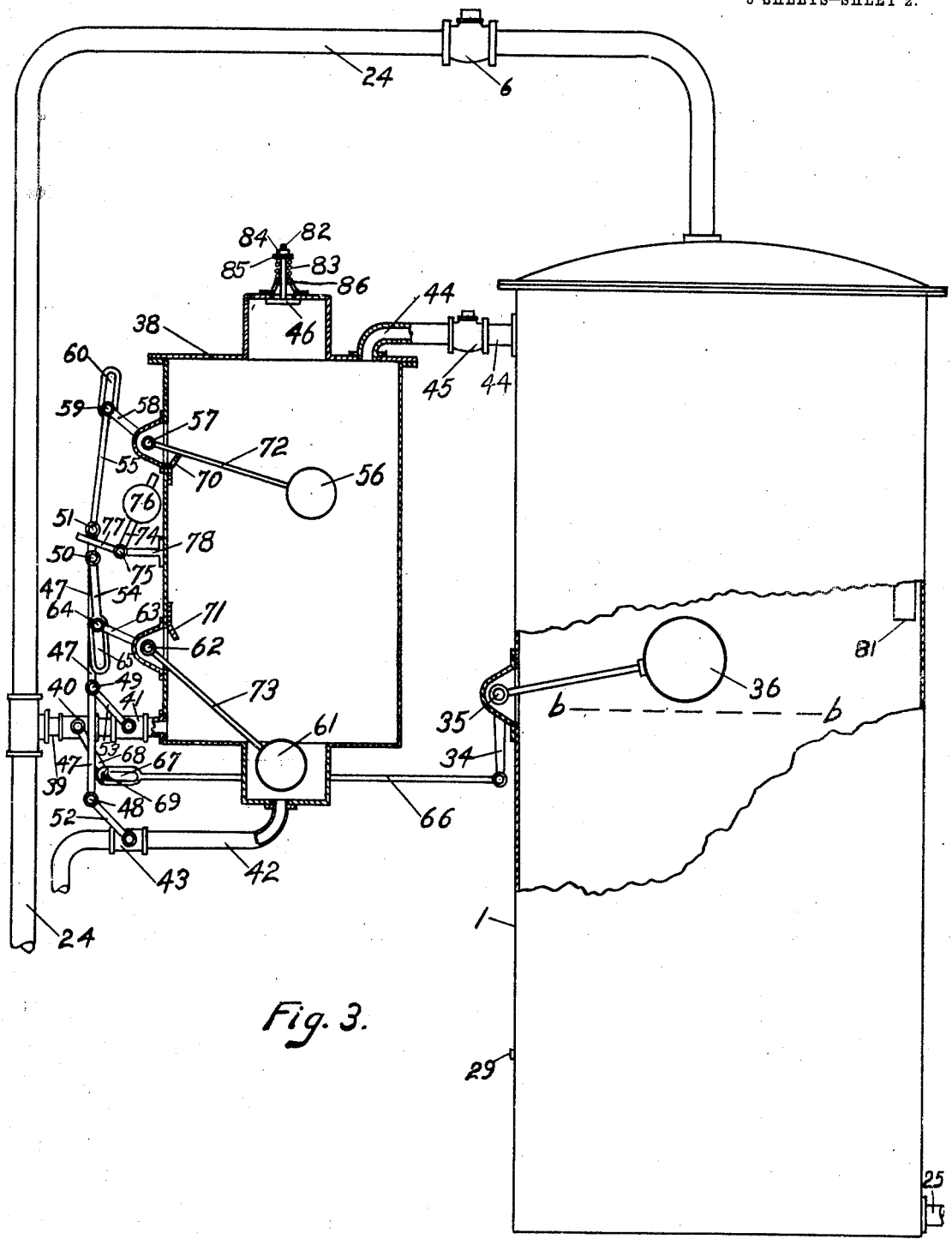
Figure 4:
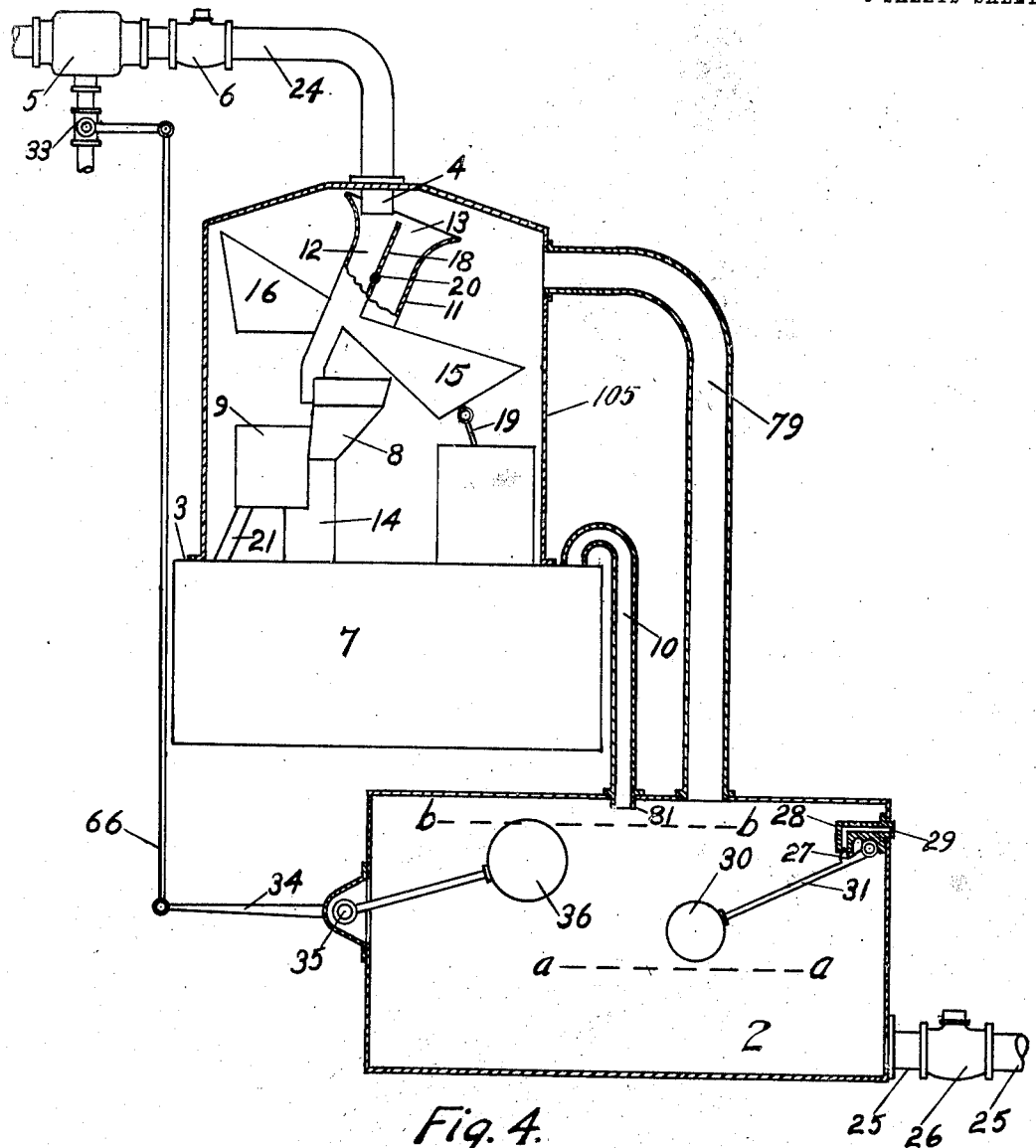
Figure 5:
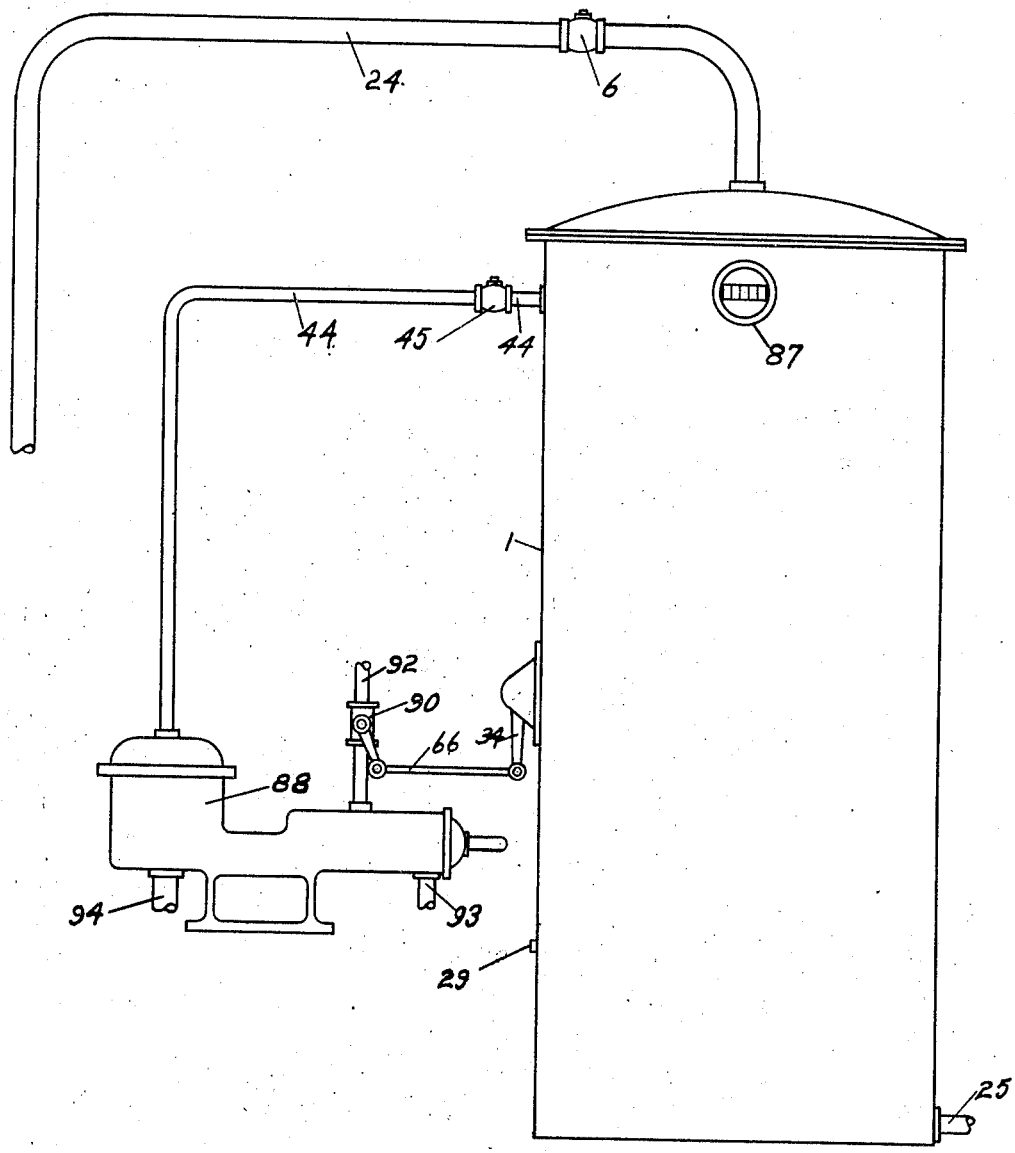

In the accompanying drawings, Figure 1, is a vertical view partly in section, showing one arrangement of my invention. Fig. 2, is a broken view at right angles to Fig. 1, showing a detail in the construction of the measuring device; Fig. 3, shows a view of the pressure meter with a device for automatically forcing air into the same; Fig. 4, shows another modification of my invention, the measuring device and storage chamber being separate; Fig. 5 shows a modification of my invention with a pump for forcing air into the same; Fig. 6 shows a modification of my invention in which air is admitted to the pump which may be used to supply water to the pressure meter; Fig. 7 shows the stuffing box, 100, with stuffing nut, 101, and packing, 102, which may allow the shaft, 20, to operate the counter, 87, and at the same time retain pressure within the meter.

As shown in accompanying drawings, my invention includes a liquid measuring device or means for measuring liquid, closed from communication with the atmosphere and partially surrounded by air or other fluid and liquid being measured, wherein the pressure at which the liquid is supplied to the device is transmitted by means of said air or other fluid to the liquid which has been measured to effect its discharge under pressure from the meter, means being provided for automatically supplying air or other fluid.

Referring to the accompanying drawings, a device 3 which delivers liquid in charges of known volume or weight, Fig. 1, is so located that its measuring compartment is closed from communication with the atmosphere by the inclosing means, 1, which may be made of any suitable material, a storage chamber, 2, being provided below the measuring device, 3, to receive the measured liquid. The measuring device, 3, is adapted to receive liquid from the nozzle, 4, measure it and deliver it through a discharge pipe, 10, to the storage chamber, 2. In this arrangement an equalizing passage, 37, may be provided to allow the passage of air from the storage chamber, 2, to the space above the measuring device, 3, and to the measuring compartment, 7, while liquid is being delivered to the storage chamber, 2, by the discharge pipe, 10. The pressure in the space above the measuring device, 3, equalizes with the pressure in the storage chamber, 2, through the passage, 37.

Another modification of my invention is shown in Fig. 4, in which the measuring device, 3, is partially inclosed separate from the storage chamber, 2. In such an arrangement the part of the measuring device ordinarily open to the atmosphere may be closed from communication with the atmosphere by the shell, 78, which together with the body of the measuring device, 3, incloses the measuring compartment, 7, thus normally cutting off communication between the measuring compartment and the atmosphere. The discharge pipe, 10, of the measuring device may be tightly connected to the storage chamber, 2, as shown at the end, 81, of the discharge pipe, and an equalizing pipe, 79, may be used to connect the shell, 78, with the storage chamber, 2, which will then provide passage for air as the water is delivered through the discharge pipe, 10, to the storage chamber, 2, the same as previously explained in connection with Fig. 1. The pressure in the space above the measuring device, 3, equalizes with the pressure in the storage chamber, 2, through the pipe, 79. In Fig. 4, the pipe, 21, is shown without the check valve, 22, of Fig. 1.

From the above it will be seen that my invention comprises three principal elements, viz., a measuring device, a storage chamber and means closing the measuring device and storage chamber from communication with the atmosphere. In Fig. 1, the closing means is simply a shell and the storage chamber, while in Fig. 4, the closing means consists of a shell, 105, the body, or shell, and pipe of the measuring device, the body or shell of the storage chamber and the equalizing pipe, 79.

I do not wish to confine myself to the use of any particular measuring device but have shown a measuring device in the accompanying drawings which may be adapted to operate under pressure. This particular measuring device has two measuring compartments, only one of which is shown at, 7, in Fig. 1, and Fig. 4. A siphon is adapted to drain each of the measuring compartments, the siphon, 10, being adapted to drain the measuring compartment, 7. A tilting member, 11, suitably mounted so as to tilt about the axis, 20, and comprising two channels, 12 and 13, separated by the dividing partition, 18, directs the liquid to the measuring compartments, the channel, 12, directing liquid to the measuring compartment, 7, through the passage, 14. This tilting member carries two receptacles, 15 and 16, which communicate with the channels, 12 and 13, respectively, and is tilted by the rising of floats, one in either compartment, the float, 17, in measuring compartment, 7, being the only one shown.

The operation of this particular measuring device is as follows:—Liquid enters the channel 12, from the nozzle, 4, and after filling the receptacle, 15, passes into the measuring compartment, 7. When the measuring compartment, 7, is nearly filled, the float, 17, will start to rise and when the measuring compartment is completely filled and liquid is about to spill over the top of the siphon, 10, the float, 17, lifts the receptacle, 15, by means of the link, 19, and tips the tilting member, 11, about its axis, 20. The liquid stored in the receptacle, 15, is thus suddenly decanted into the measuring compartment, 7, to cause the liquid in said compartment to spill over the top of the siphon, 10, in sufficient quantity to start the siphon operating, thereby discharging the contents from the measuring compartment, 7. When the float, 17, tips the tilting member, 11, channel, 13, is placed in communication with the nozzle, 4, and the liquid then passes through the channel, 13, and after filling receptacle, 16, passes into the other measuring compartment which is similar to measuring compartment, 7, a portion of this measuring compartment being shown at 23, Fig. 2, where a similar operation takes place.

Any convenient form of register or counter may be used to register each single unit charge or each combined double unit charge, and may be located exteriorly to the pressure meter as shown at 87, Fig. 5 and Fig. 6. The counter, 87, may be supported by pieces 103 and 104. The shaft, 20, of Fig. 1, may extend through the pressure meter to operate the counter as the tilting member tips, any suitable stuffing box 100, Fig. 7 being used at the point where the shaft, 20, passes through the meter to retain the pressure therein.

The upper end of the passage, 14, may be provided with a shield, 8, to collect the liquid which may fall against it and convey such liquid to the measuring compartment, 7. It is evident that when liquid is flowing very rapidly to the measuring compartment, that the level of the liquid in the passage, 14, would tend to reach a higher point than when the liquid is flowing more slowly to the measuring compartment, and this variation would cause a variation in the unit charge. To overcome this objection a chamber, 9, is provided partially surrounding the upper end of the passage, 14. This chamber, 9, is drained by a pipe, 21, to the opposite measuring compartment, 23. The pipe, 21, may have a check valve, 22, which allows passage of liquid from the chamber, 9, to the measuring compartment, 23, but which does not allow liquid to pass from the measuring compartment, 23, to the chamber, 9.

The capacity of the receptacle, 15, is such that, even though the supply of liquid to the measuring device is very slow, when the receptacle is tilted the compartment, 7, is filled and the level of liquid reaches the top of the passage, 14, or possibly a few drops spill over into the chamber, 9. Now if the supply of liquid to the measuring device is very great the passage, 14, will overflow a larger amount to chamber, 9, when the receptacle, 15, is discharged to the measuring compartment, 7, and this overflow will be conducted to the empty compartment, 23, through the pipe, 21, where it forms a part of the next charge from that compartment. Thus the measuring compartment is always filled to the same level regardless of the rate of supply and the measuring device is thereby made very much more accurate. A similar chamber (not shown) receives the overflow after the receptacle, 16, is discharged, and a pipe similar to pipe, 21, conducts the same to measuring compartment, 7.

The check valve, 22, may in some cases be omitted (see Fig. 4) for very nearly the same result may be obtained without the check valve by using a pipe of small cross-sectional area, as but very little liquid would then pass through the pipe from the measuring compartment, 23, to the chamber, 9, in the very short interval of time that elapses during which the liquid is high enough in the measuring compartment, 23, and its passage, 80, to flow from measuring compartment, 23, to chamber, 9. Thus the passing of this liquid to chamber, 9, may be checked by the check valve, 22, but if the pipe, 21, is made small, as previously described, the check valve may be dispensed with.

The level of the liquid in the storage chamber, 2, should be kept below the end, 81, of the discharge pipe, 10, the space above this level not occupied by the liquid, being measured, being occupied by air or other suitable fluid. Liquid delivered to the measuring device will then be measured as previously described and discharged into the storage chamber, 2.

I do not confine myself to the use of the particular device described, as any measuring device or weighing machine such for instance as described by F. H. Richards in his United States Letters Patent No. 607465, July 19, 1898, may be substituted for the measuring device previously described.

An air injector, 5, having an air inlet valve, 33, Figs. 1 and 4, a drum, 38, Fig. 3, the operation of which will be described later, a suitable pump, 88, Fig. 5, or an air valve, 89, Fig. 6, the operation of which will be more fully described, may be used to supply air to the meter and to bring the air within the meter to the pressure desired. Under ordinary conditions it is not absolutely necessary to supply air to the meter by these means as most liquid has some air in it and this air which is continually rising to its surface and being given off will settle out of the liquid and remaining in the meter will gradually force the level of the liquid down lower in the storage chamber. Under some conditions it is advisable to supply air to the meter as for instance to eliminate delay in starting the device or to make up for air leakage, while in some cases it is preferable to provide means for emitting air from the meter, due to the accumulation of air as previously described.

Liquid is supplied to the meter by the pipe, 24, which may have a check valve, 6, allowing passage of liquid to but not from the meter. The liquid is delivered by a suitable nozzle, 4, to the measuring device, free, where it is measured and then discharged to the storage chamber, 2, which may be a part of the inclosing means. The meter being under sufficient pressure, the liquid from the storage chamber, 2, is forced, through the pipe, 25, which may be provided with a check valve, 26, allowing passage of liquid from the storage chamber, 2, but not in the reverse direction.

A small valve comprising a seat, 28, which communicates with the atmosphere through the hole 29, may be used to emit air or fluid from the meter if the pressure within the meter is greater than atmospheric pressure when so desired. The use of such an air emitting valve is not necessary but may be used in some cases. By connecting a float, 30, by means of the arm, 31, and pivot joint, 32, to the valve point, 27, the operation of this air valve may be made automatic. When the liquid level falls to some level below the line $a$ $a$, the float, 30, will drop, open the valve, 27, and allow the escape of air to the atmosphere. The corresponding decrease in pressure will allow more liquid to enter from the pipe, 24, and when the water level again rises higher than $a$, $a$, the valve, 27, will close. When it is desired to measure liquid under vacuum, the air emitting valve, 28, should not be used, and any air admitted will pass out with the water when the water level reaches the pipe, 25.

When it is advisable to supply air to the meter, the amount of air allowed to enter may be regulated by a valve, 33, Figs. 1 and 4, a valve, 40, Fig. 3, a valve, 90, Fig. 5, or a valve 89, Fig. 6. This regulation may be made automatic as shown in Fig. 3, Fig. 4, Fig. 5 and Fig. 6, by connecting the valve, 33, valve, 40, valve, 90, or valve 89, to the arm, 34, of the shaft, 35, which is operated by a float, 36, on the inside of the meter. A rod, 66, may be used to form this connection. When the liquid reaches some level as $b$, $b$, the float rises thereby opening the valve, 33, 40, 90, or 89 as the case may be and thus alow the injection of more air to the meter which will cause the water level in the pressure meter to fall thereby shutting off the valve, 33, 40, 90, or 89.

As the space within the meter above the measuring device, 3, communicates with the space above the storage chamber, by means of the space, 37, Fig. 1, and pipe, 79, Fig. 4, the pressure above the measuring device and above the storage chamber constantly equalizes and liquid entering the measuring device through the nozzle, 4, will pass to the measuring compartments of the measuring device and out of the siphon pipes in the same manner regardless of the pressure within the meter.

It is evident that an increase of pressure in the supply line, 24, will cause an increase of pressure within the meter, and this increase in pressure will tend to force more liquid out of the discharge pipe, 25. Thus if the meter be connected in a boiler feed line with a pump supplying water through the pipe, 24, as shown at 91, Fig. 6, and if the pipe, 25, leads to the boiler, more or less water may be fed to the boiler by regulating the speed of the pump as is done in ordinary practice without any shifting of valves or other inconvenience or change in the arrangement. If more water is supplied to the meter, more water will be delivered automatically to the boiler and vice versa. The measuring device thus arranged provides an accurate method of measuring liquid under pressure or vacuum which has not been possible heretofore and the regulation of the supply and demand of liquid is provided for automatically.

Fig. 3, shows a pressure meter and a pressure drum, 38, adapted to automatically supply air to the pressure meter as desired. This pressure drum may be used in the place of the injector, 5, and shows one of the modifications which may be used as a part of my invention.

A pipe, 39, leads from the main water feed line, 24, or any other suitable source to the drum, 38. In the pipe, 39, I preferably locate two valves, 40 and 41. A pipe, 42, having a valve, 43, leads from the lower part of the drum, 38, and a pipe, 44, leads from a point near the top of the drum to the meter. A check valve, 45, allowing passage of fluid from the drum to the pressure meter may be used to prevent passage of fluid from the pressure meter to the drum. A puppet valve, 46, allows air to enter the drum when the drum is below atmospheric pressure and prevents the escape of fluid from the drum. The stem, 82, of the valve, 46, is slidingly received in a guide, 86, a coil spring, 83, surrounding the stem, 82, is slightly compressed and a washer, 85, below a nut, 84, on the stem, 82, holds the spring in compression.

A rod, 47, carries four pivots, 48, 49, 50 and 51. The pivot, 48, connects the rod, 47, to the arm, 52, of the valve 43; the pivot 49, in like manner connects the rods 47, to the arm 53, of the valve, 41; the pivot, 50, connects the rod, 47, to a slotted link, 54, and the pivot, 51, connects the rod, 47, to the slotted link, 55.

A bell crank pivoted at 75, having the arms, 74 and 77, is carried by any suitable means, as a bracket, 78, attached to the drum, 38. The arm, 74, carries a weight, 76, and the arm, 77, is arranged to strike against the pivots, 50 and 51. When the weight, 76, has been moved slightly past the vertical center line through pivot, 75, it drops causing the arm, 77, to strike against the pivot, 50 or 51, as the case may be, thereby moving the rod, 47, up or down. A float, 56, inside the drum operates to turn the shaft, 57, which in turn operates the arm, 58. A pin, 59, connected to the arm, 58, is slidingly received in the slot, 60, of the link, 55. A float 61, in a like manner operates the arm, 63, by means of the shaft, 62, and a pin, 64, connected to the arm, 63, is slidingly received in the slot, 65, of the link, 54.

As previously suggested, the float, 36, inside the pressure meter may be used to automatically regulate the operation of this air supplying means. The float, 36, operates to turn the shaft, 35, thereby swinging the arm, 34, which is connected to the shaft, 35. The arm, 34, operates a rod, 66, in either direction thereby causing the arm, 68, to open and close the valve, 40. The rod, 66, is provided with a slot, 67, and the end of the arm, 68, is provided with a thumb screw, 69. The thumb screw, 69, may be tightened so that the pin in the end of the arm, 68, cannot slide in the slot, 67, or it may be left loose allowing the float, 36, to swing through a considerable arc without actuating the valve, 40. The valve, 41, and the valve, 43, are both actuated by the rod, 47. An upward motion of the rod, 47, closes the valve, 43, and opens the valve, 41, the valve, 43, being made so as to close before valve, 41, opens. A downward motion of the rod, 47, closes valve, 41, and opens valve 43, the valve, 41, closing before valve, 43, opens.

The floats, 56 and 61, are so made that their buoyant force, when submerged in the liquid being used in the drum, 38, is about equal to their weight in air, so that the same force is exerted to operate the valves, 41 and 43, in one direction as in the other. A stop, 70, may be used to limit the motion of the float, 56, when the rod, 72, carrying the float, 56, meets such stop. Likewise, a stop, 71, may limit the motion of the float, 61, when the rod, 73, strikes the stop, 71.

The operation of the drum is as follows:— When the level of liquid in the meter gets as high as is desirable the float, 36, rises, thereby opening the valve, 40, which allows liquid to pass from the main line, 24, or any other convenient source to the valve, 41, and if the valve, 41, is open liquid will pass directly into the drum, 38. Suppose the floats, 56 and 61, to be as shown with the drum 38, nearly empty and the rod, 47, in its uppermost position, the valve, 43, being closed and the valve, 41, being open. Liquid will then pass to the drum, 38, and rising in the drum will force air into the meter through the pipe, 44, and check valve, 45. The float, 61, will be raised until the rod, 73, strikes its stop, 71, which is just before the pin, 64, which is moving in the slot, 65, reaches the opposite end of the slot, 65, so that the float, 61, exerts no force to move the rod, 47, down. The valve, 41, remains open and the valve, 43, remains closed. The liquid level rises forcing air to the meter, as above described raising the float, 56, which pushes the rod, 47, down and at the same time pushing down on the bell crank arm, 77, causes the weight, 76, to move from right to left. When the float, 56, has reached a point near the top of the drum, 38, and the air has been forced into the meter, the weight, 76, passes the vertical center line through the pivot, 75, and dropping pushes the rod, 47, down thereby closing the valve, 41, and opening the valve, 43. The valve, 43, being open the liquid in the drum, 38, will flow out through the pipe, 42, at the same time drawing in a fresh supply of air through the puppet valve, 46. The float, 56, drops until the rod, 72, strikes the stop, 70, the pin, 59, moving in the slot, 60, without raising the rod, 47. When the liquid reaches a point near the bottom of the drum, 38, the float, 61, which has been lowering and thereby raising the rod, 47, pushes the weight, 76, past its vertical center line as described above but in the reverse direction, and the weight drops moving the rod, 47, up thereby closing the valve, 43, and opening the valve, 41, which again admits liquid from the main pipe, 24, whereupon the cylcle of operation just described is repeated. When a sufficient amount of air has been forced into the meter, the liquid level therein will fall lowering the float, 36, which closes the valve, 40, thereby cutting off the supply of liquid to the drum, whereupon air soon ceases to pass from the drum, 38, to the meter.

If the rod, 66, is connected to the arm, 68, of the valve, 40, by tightening the thumb screw, 69, it is evident that a slight rising or falling of the liquid in the storage chamber, 2, will open or close the valve, 40, so that it might be continually working back and forth, a condition which is not ordinarily necessary and which might in some cases be objectionable. With the thumb screw, 69, loose allowing the rod, 66, to move the length of the slot, 67, without actuating the valve, 40, the ball, 36, may move a greater distance before opening or closing the valve, 40.

As previously mentioned, a suitable pump, 88, Fig. 5, may be used to supply air to the pressure meter. In this particular pump, steam from the pipe line, 92, may be used as power. The steam exhaust line is shown at 93, while 94 is the air intake, air being forced to the meter through the pipe, 44, supplied with a check valve, 45. The operation of the pump, 88, is made automatic by connection to the arm, 66, as previously described.

Fig. 6 shows a boiler feed pump, 91, supplying water through the pipe, 24, to a pressure meter. A pipe line, 95, supplies steam to drive the pump, 96 is the steam exhaust, and 97 is the line supplying water to the pump. When the pressure in the pipe, 97, is below atmospheric pressure as is the case when the pump, 91, is lifting water, air will be admitted to the pump, 91, along with the water from pipe 97, provided air valve, 89, is opened slightly. This air will be forced with the water into the meter where it will separate as previously described, thus supplying air to the meter. When the pipe 97 would normally be under pressure greater than atmospheric pressure, a valve, 98, in the pipe line, 97, may be partially closed so as to throttle the supply of water enough to cause a pressure less than atmospheric pressure in the pipe, 97, when air may be drawn in through the air valve, 89, as described. A check valve, 99, may be used to prevent water from issuing from the pipe, 97, when the pressure therein fluctuates above and below atmospheric pressure.

What I claim as my invention and desire to secure by Letters Patent is as follows—

1. In a device of the character described, the combination of a liquid measuring chamber closed to the atmosphere, a storage chamber communicating therewith whereby to equalize the fluid pressure in the measuring chamber and storage chamber, means to deliver liquid from the measuring chamber to the storage chamber, and means to discharge the liquid from the storage chamber, of means controlled by the liquid level within the storage chamber to admit fluid to said chambers.

2. In a device of the character described, the combination of a liquid measuring chamber closed to the atmosphere, a storage chamber communicating therewith whereby to equalize the fluid pressure in the measuring chamber and storage chamber, means to deliver liquid to the measuring chamber, means to deliver liquid from the measuring chamber to the storage chamber, and means to discharge the liquid from the storage chamber, of means controlled by the liquid level within the storage chamber to admit fluid under pressure to said chambers.

3. In an apparatus of the character described, the combination with a liquid measuring device closed to the atmosphere, a storing means in communication therewith whereby to equalize the fluid pressure in the measuring device and storing means, means to deliver liquid to such measuring device, means to deliver liquid from the measuring device to the storing means, and means to discharge liquid from the storing means, of means to automatically supply said measuring device and storing means with fluid under pressure.

4. In a device of the character described, the combination of a liquid measuring chamber closed to the atmosphere, a storage chamber communicating therewith whereby to equalize the fluid pressure in the measuring chamber and storage chamber, means to deliver liquid to the measuring chamber, means to deliver liquid from the measuring chamber to the storage chamber, and means to discharge the liquid from the storage chamber, of means automatically controlled by the liquid level within the storage chamber to admit fluid under pressure to said chambers.

5. In a device of the character set forth, the combination with a liquid measuring element closed to the atmosphere, a storing element in free communication therewith whereby the fluid pressure is equalized in the respective elements, siphoning means to automatically discharge the liquid contents of the measuring element into the storage element, and means to discharge the liquid contents of the storing element, of means controlled by the liquid level in the storing element to admit fluid to at least one of said elements.

6. In a device of the character set forth, the combination with a liquid measuring element closed to the atmosphere, a storing element in free communication therewith whereby the fluid pressure is equalized in the respective elements, siphoning means to automatically discharge the liquid contents of the measuring element into the storing element, and means to discharge the liquid contents of the storing element, of means controlled by the liquid level in the storing element to admit fluid to and to arrest its admission to at least one of said elements.

7. In a device of the character set forth, the combination with a liquid measuring element closed to the atmosphere, a storing element in free communication therewith whereby the fluid pressure is equalized in the respective elements, means to automatically discharge the liquid contents of the measuring element into the storing element, and means to discharge the liquid contents of the storing element, of means controlled by the liquid level in the storing element to admit fluid to at least one of said elements.

8. In a device of the character set forth, the combination with a liquid measuring element closed to the atmosphere, a storing element in free communication therewith whereby the fluid pressure is equalized in the respective elements, means to automatically discharge the liquid contents of the measuring element into the storing element, and means to discharge the liquid contents of the storing element, of means controlled by the liquid level in the storing element to admit fluid to at least one of said elements.

9. In a device of the character described, the combination of a liquid measuring element closed to the atmosphere, a storage element in communication therewith whereby to equalize the pressure within the respective elements, means to deliver liquid to the measuring element, means to deliver liquid from the measuring element to the storage element, and means to discharge the liquid from the storage element, of means controlled by the liquid level within the storage element to admit air under pressure to at least one of said elements.

In testimony whereof, I have affixed my signature in presence of two witnesses.

HARLEY CLIFFORD ALGER.

Witnesses:
 EMMA ALGER,
 MARGARET KLOPF.